(12) United States Patent
Comstock, II

(10) Patent No.: US 7,722,198 B2
(45) Date of Patent: May 25, 2010

(54) REFLECTIVE OCCULTING MASK AND METHOD FOR MANUFACTURING THE REFLECTIVE OCCULTING MASK

(75) Inventor: Lovell E Comstock, II, Charlestown, NH (US)

(73) Assignee: Corning Incorporated, Corning, NY (US)

( * ) Notice: Subject to any disclaimer, the term of this patent is extended or adjusted under 35 U.S.C. 154(b) by 194 days.

(21) Appl. No.: 11/807,784

(22) Filed: May 30, 2007

(65) Prior Publication Data

US 2008/0297909 A1 Dec. 4, 2008

(51) Int. Cl.
  *G02B 27/00* (2006.01)
(52) U.S. Cl. .................. 359/601; 250/203.1; 250/203.6
(58) Field of Classification Search ........................ None
  See application file for complete search history.

(56) References Cited

U.S. PATENT DOCUMENTS

| | | | | |
|---|---|---|---|---|
| 3,614,239 | A | * | 10/1971 | Kissell .................. 356/139.02 |
| 4,695,119 | A | * | 9/1987 | Neil ............................ 359/353 |
| 4,923,293 | A | * | 5/1990 | Nelles et al. ................. 359/364 |
| 5,189,295 | A | | 2/1993 | Falbel |
| 5,249,080 | A | | 9/1993 | Watson et al. |
| 5,291,333 | A | | 3/1994 | Mills et al. |
| 5,450,352 | A | | 9/1995 | Ftaclas et al. |
| 6,597,510 | B2 | | 6/2003 | Bunkenburg et al. |
| 7,130,051 | B2 | | 10/2006 | Oppenheimer et al. |
| 2002/0105724 | A1 | * | 8/2002 | Sugiyama ................... 359/399 |
| 2004/0156087 | A1 | * | 8/2004 | Oppenheimer et al. ...... 359/244 |
| 2007/0286461 | A1 | * | 12/2007 | Deforest ..................... 382/103 |

OTHER PUBLICATIONS

Green et al., High Contrast Imaging with the JWST NIRCAM Coronagraph, Proceedings of the SPIE—The International Society of Optical Engineering, Aug. 18, 2005, vol. 5905, p. 1-9.*
Stewart et al., Design and Development of a 329-segment tip-tilt piston mirror array for space-based adaptive optics, Proceedings of the SPIE—The International Society of Optical Engineering, Jan. 21, 2006, vol. 6113, p. 1-11.*

* cited by examiner

*Primary Examiner*—Lee Fineman
(74) *Attorney, Agent, or Firm*—Timothy M Schaeberle

(57) ABSTRACT

A optical instrument (e.g., coronagraph) is described herein that has a pick-off mirror with a surface having an array of reflective structures (reflective occulting mask) machined therein which enables an optical image of one or more low intensity objects (e.g., planets) to be obtained when the low intensity object(s) are located in close proximity to a high intensity object (e.g., sun). Also described herein, is a method for manufacturing the pick-off mirror which has a surface with an array of reflective structures (reflective occulting mask) that are machined therein.

13 Claims, 4 Drawing Sheets

US 7,722,198 B2

REFLECTIVE OCCULTING MASK AND METHOD FOR MANUFACTURING THE REFLECTIVE OCCULTING MASK

TECHNICAL FIELD

The present invention relates to an optical instrument (e.g., coronagraph) that has a pick-off mirror with a surface having an array of reflective structures (reflective occulting mask) machined therein which enables an optical image of one or more low intensity objects (e.g., planets) to be obtained when the low intensity object(s) are located in close proximity to a high intensity object (e.g., sun).

BACKGROUND

An optical instrument known as a coronagraph was originally invented to observe the sun's corona at times other than when there is a solar eclipse. This type of optical instrument has since been used in other astronomical applications to help obtain an optical image of low intensity object(s) (e.g., planet(s)) that are located in close proximity to a high intensity object (e.g., sun). In addition, this type of optical instrument could be used in military applications to help obtain an optical image which can be used to identify low intensity object(s) (e.g., missile(s)) that are located in close proximity to a high intensity object (e.g., sun or other infrared source). Two traditional optical instruments 100 and 200 are described next with respect to FIGS. 1 and 2.

Referring to FIG. 1 (PRIOR ART), there is shown a diagram of a traditional optical instrument 100 which has been setup to obtain an optical image 102 of three low intensity objects 104 (e.g., three planets 104) that are located in close proximity to a high intensity object 106 (e.g., sun 106) (note: the high intensity object 106 does not appear in the final optical image 102). As shown, the traditional optical instrument 100 includes an imaging device 108 (e.g., refractive imaging device 108, reflective imaging device 108), a pick-off mirror 110 and a re-imaging device 112 (e.g., refractive re-imaging device 112, reflective re-imaging device 112). The pick-off mirror 110 has a surface 115 with a hole 116 extending there through which functions like an occulting mask to re-channel light 111 associated with the sun 106 away from the light 113 associated with the three planets 104 (see the front view of the pick-off mirror 110).

In this example, the imaging device 108 has been positioned to receive an image 114 that contains light 111 associated with the sun 106 and also contains light 113 associated with each of the three planets 104. Plus, the pick-off mirror 110 has been positioned on an optical path 117 (at an intermediate focal plane) to receive the image 114 from the imaging device 108. In particular, the pick-off mirror 110 has been positioned such that the hole 116 receives a portion of the image 114 containing the light 111 associated with the sun 106 and re-channels this light 111 off the optical path 117 and away from the re-imaging device 112. In addition, the pick-off mirror 110 has been positioned such that a part of the surface 115 which does not have the hole 116 therein receives a portion of the image 114 containing the light 113 associated with the three planets 104 and reflects that portion of the image 114 on the optical path 117 towards the re-imaging device 112. Upon receiving the light 113 reflected from the pick-off mirror 110, the re-imaging device 112 generates the desired optical image 102 that contains the light 113 associated with the three planets 104 but does not contain the light 111 associated with the sun 106 (note: the desired optical image 102 is focused on the focal plane 120 which is located on the optical path 117).

Referring to FIG. 2 (PRIOR ART), there is shown a diagram of another traditional optical instrument 200 which has been setup to obtain an optical image 202 of three low intensity objects 204 (e.g., three planets 204) that are located in close proximity to a high intensity object 206 (e.g., sun 206) (note: the high intensity object 206 does not appear in the final optical image 202). As shown, the traditional optical instrument 200 includes an imaging device 208 (e.g., refractive imaging device 208, reflective imaging device 208), a pick-off mirror 210 and a re-imaging device 212 (e.g., refractive re-imaging device 212, reflective re-imaging device 212). In this case, the pick-off mirror 210 has a surface 215 where a portion of which has one or more opaque spots 216 (only one shown) which function like an absorptive occulting mask and absorb light 211 associated with the sun 206 while not affecting the light 213 associated with the three planets 204 (see the front view of the pick-off mirror 210).

In this example, the imaging device 208 has been positioned to receive an image 214 that contains light 211 associated with the sun 206 and also contains light 213 associated with each of the three planets 204. Plus, the pick-off mirror 210 has been positioned on an optical path 217 (at an intermediate focal plane) to receive the image 214 from the imaging device 208. In particular, the pick-off mirror 210 has been positioned such that the opaque spot(s) 216 receives a portion of the image 214 containing the light 211 associated with the sun 206 and absorbs this light 211 such that it will not be reflected on the optical path 217 towards the re-imaging device 212 (note: the opaque spot(s) 216 is typically an adsorptive material which can be rather difficult to apply in a precise manner on the surface 215 of the pick-off mirror 210). In addition, the pick-off mirror 210 has been positioned such that a part of the surface 215 not covered by the opaque spot(s) 216 receives a portion of the image 214 containing the light 213 associated with the three planets 204 and reflects that portion of the image 214 on the optical path 217 towards the re-imaging device 212. Upon receiving the light 213 reflected from the pick-off mirror 210, the re-imaging device 212 generates the desired optical image 202 that contains the light 213 associated with the three planets 204 but does not contain the light 211 associated with the sun 206 (note: the desired optical image 202 is focused on the focal plane 220 which is located on the optical path 217).

Although these two traditional optical instruments 100 and 200 function relatively well there is still a desire for an improved optical instrument that can be used to obtain an optical image of one or more low intensity objects (e.g., planets, missiles) that are located in close proximity to a high intensity object (e.g., sun). This need and other needs are satisfied by the present invention.

SUMMARY

In one aspect, the present invention provides an optical instrument which includes: (a) an imaging device that receives an image which contains light associated with a high intensity object and light associated with a low intensity object; (b) a pick-off mirror having a surface with a reflective occulting mask machined thereon that receives the image from the imaging device and deflects the light associated with the high intensity object and reflects the light associated with the low intensity object; and (c) a re-imaging device that receives the reflected light associated with the low intensity object and generates an image that contains the light associated with the low intensity object but does not contain the light associated with the high intensity object.

In yet another aspect, the present invention provides a pick-off mirror comprising a surface having a reflective occulting mask formed from a plurality of reflective structures machined within the surface wherein the surface and the reflective occulting mask receive an image containing light associated with a high intensity object and light associated with a low intensity object and wherein a portion of the surface with the reflective occulting mask directs the light associated with the high intensity object out off an optical path so that the high intensity object will not be part of a final image and a portion of the surface without the reflective occulting mask reflects the light associated with the low intensity object on the optical path so that the low intensity object will be part of the final image.

In still yet another aspect, the present invention provides a method for manufacturing a pick-off mirror which is utilized in an optical instrument. The method includes the steps of: (a) securing a mirror to a turning machine which has a cutting tool positioned across from a surface of the mirror; (b) using the cutting tool to machine a reflective structure within the surface of the mirror; and (c) repeating the using step such that the cutting tool machines an array of the reflective structures (which form a reflective occulting mask) within the surface of the mirror.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 3:
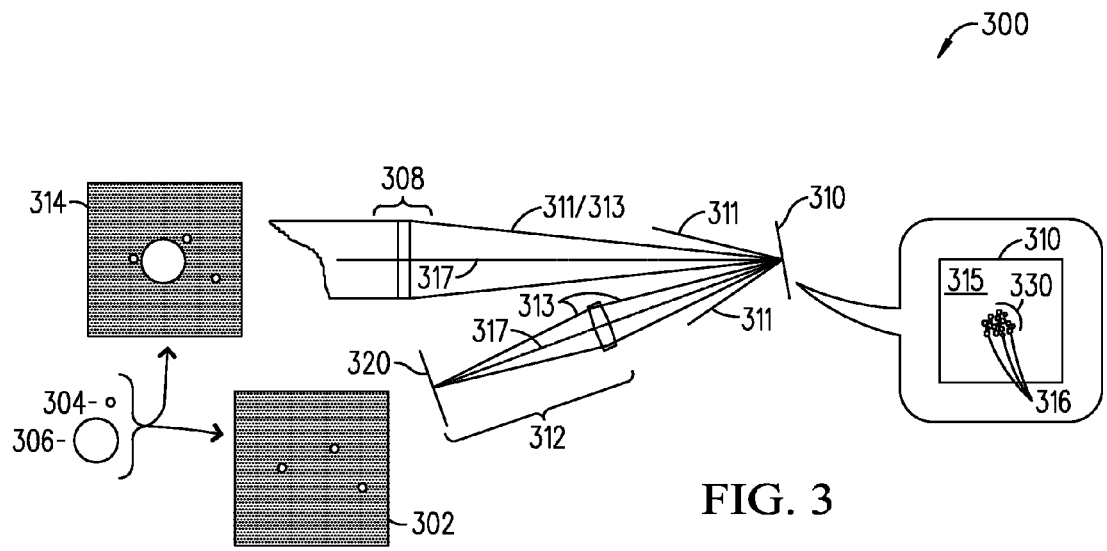
FIG. 3 is a diagram illustrating the basic components of an optical instrument which has a pick-off mirror with an array of reflective structures (reflective occulting mask) that has been setup to obtain an optical image containing three low intensity objects (e.g., planets) that are located in close proximity to a high intensity object (e.g., sun) in accordance with the present invention.

Referring to FIG. 3, there is shown a diagram of an optical instrument 300 which has a pick-off mirror 310 with an array of reflective structures 316 (reflective occulting mask 330) that have been machined therein in accordance with the present invention. In this example, the optical instrument 300 has been setup to use the pick-off mirror 310 to obtain an optical image 302 of three low intensity objects 304 (e.g., three planets 304) which are located in close proximity to a high intensity object 306 (e.g., sun 306)(note: the high intensity object 306 does not appear in the final optical image 302). As shown, the optical instrument 300 includes an imaging device 308 (e.g., refractive imaging device 308, reflective imaging device 308), a pick-off mirror 310 and a re-imaging device 312 (e.g., refractive re-imaging device 312, reflective re-imaging device 312). The pick-off mirror 310 has a surface 315 with a portion of which that has had an array of reflective structures 316 machined therein which function like a reflective occulting mask 330 to deflect light 311 associated with the sun 306 and not affect the light 313 associated with the three planets 304 (see the front view of the pick-off mirror 310)(see FIGS. 6-7).

In this example, the imaging device 308 has been positioned to receive an image 314 that contains light 311 associated with the sun 306 and also contains light 313 associated with each of the three planets 304. Plus, the pick-off mirror 310 has been positioned on an optical path 317 (at an intermediate focal plane) to receive the image 314 from the imaging device 308. In particular, the pick-off mirror 310 has been positioned such that the array of reflective structures 316 receives a portion of the image 314 containing the light 311 associated with the sun 306 and deflects this light 311 off the optical path 317 and away from the re-imaging device 312. In addition, the pick-off mirror 310 has been positioned such that a part of the surface 315 not covered by the array of reflective structures 316 (reflective occulting mask 330) receives a portion of the image 314 containing the light 313 associated with the three planets 304 and reflects that portion of the image 314 on the optical path 317 towards the re-imaging device 312. Upon receiving the light 313 reflected from the pick-off mirror 310, the re-imaging device 312 generates the desired optical image 302 that contains the light 313 associated with the three planets 304 but does not contain the light 311 associated with the sun 306 (note: the desired optical image 302 is focused on the focal plane 320 which is located on the optical path 317).

Figure 4:
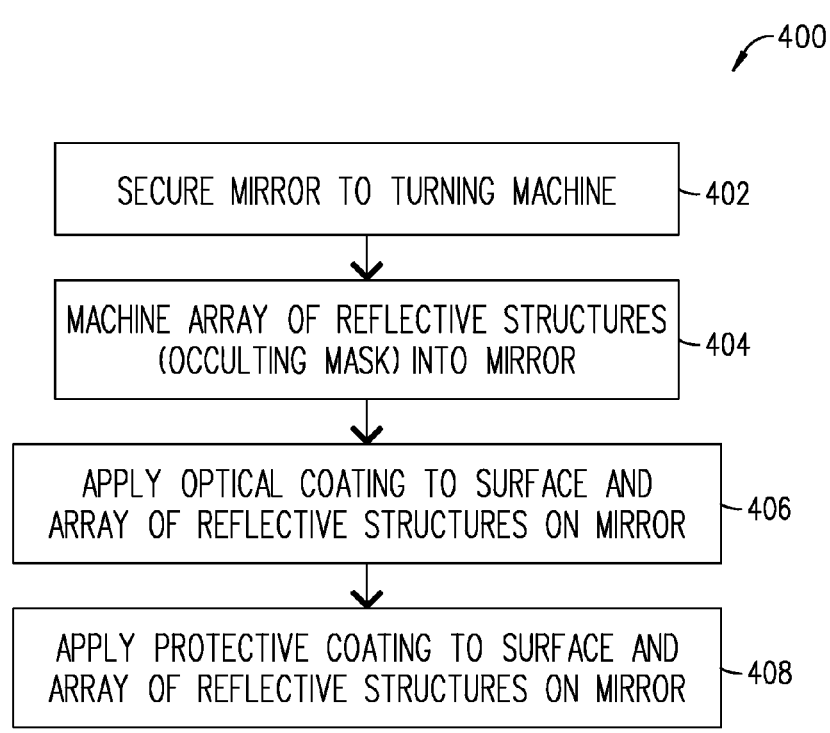
FIG. 4 is a flowchart illustrating the basic steps of manufacturing a pick-off mirror which has an array of reflective structures (reflective occulting mask) in accordance with the present invention.

Referring to FIG. 4, there is a flowchart illustrating the basic steps for manufacturing the pick-off mirror 310 in accordance with one embodiment of the present invention. Beginning at step 402, a "non-finished" pick-off mirror 310 with a smooth surface 315 is secured to a base support 331 on a computer numerical control (CNC) diamond turning machine 332 (which has three axis of motion X, Y, Z)(see FIG. 5). The diamond turning machine 332 has a spindle/tool holder 334 with a diamond cutting tool 336 installed therein that is positioned across from the surface 315 of the "non-finished" pick-off mirror 310 (see FIG. 5). At step 404, the diamond turning machine 332 is controlled to rotate the diamond cutting tool 336 and move the diamond cutting tool 336 towards the surface 315 of the "non-finished" pick-off mirror 310 such that the diamond cutting tool 336 machines a reflective structure 316 at a predetermined location on the surface 315 of the pick-off mirror 310. This machining step 104 is repeated until the diamond cutting tool 336 machines an array of the reflective structures 316 within the surface 315 of the pick-off mirror 310 (note 1: the array of reflective structures 316 form the reflective occulting mask 330)(note 2: if desired the "non-finished" pick-off mirror 310 instead could be moved towards the diamond cutting tool 336). At step 406 (optional), an optical coating is applied to the surface 315 and the reflective occulting mask 330. The specific type of optical coating used would depend on the particular operating wavelength of the optical instrument 300. For instance, the optical coating could be silver if the optical instrument 300 operated in an ultraviolet wavelength or a visible wavelength. Or, the optical coating could be aluminum if the optical instrument 300 operated in a visible wavelength. Alternatively, the optical coating could be gold if the optical instrument 300 operated in an infrared wavelength. At step 408 (optional), another coating could be applied on top of the optical coating where this additional coating is selected to help enhance the reflectivity of the pick-off mirror 310 and to environmentally protect the pick-off mirror 310. For instance, this additional coating could be magnesium fluoride or silicon monoxide.

Figure 5:
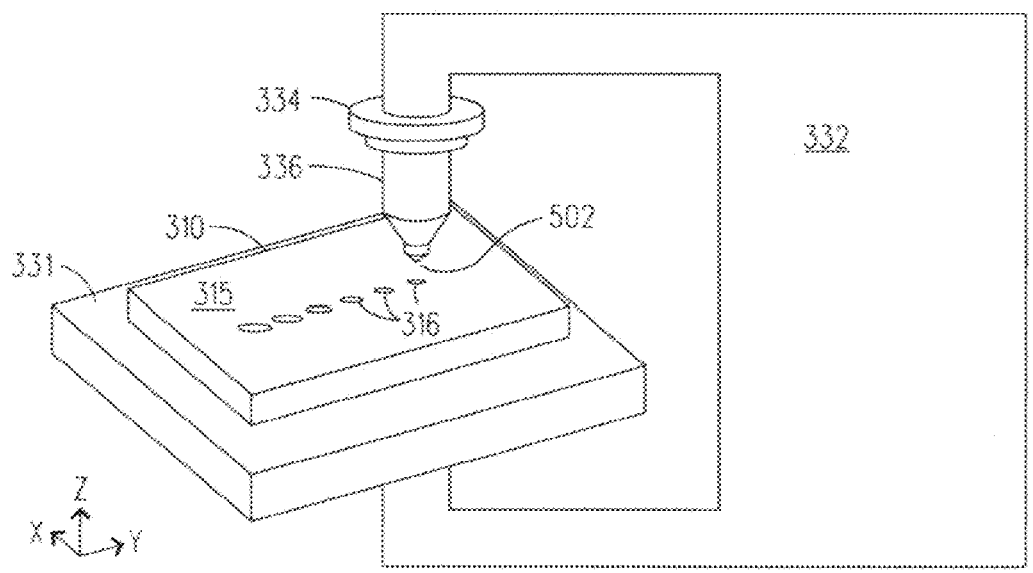
FIG. 5 is a diagram used to help explain how a diamond turning machine can manufacture a pick-off mirror which has an array of reflective structures (reflective occulting mask) in accordance with the present invention.

Referring to FIG. 5, there is a diagram illustrating the basic components of an exemplary diamond turning machine 332 that can use a diamond cutting tool 336 to machine an array of reflective structures 316 within the surface 315 of the pick-off mirror 310 in accordance with the present invention. As shown, the diamond turning machine 332 has a spindle/tool holder 334 with a diamond cutting tool 336 installed therein that is positioned across from the surface 315 of the pick-off mirror 310 that has been secured to the base support 330. In this embodiment, the geometry of the diamond cutting tool 336 was defined by performing a stray light analysis using a LightTools software package. In addition, the diamond cutting tool 336 has a tip 502 that rotates and moves on a Z-axis to form reflective structures 316 within the surface 315 of the pick-off mirror 310. The tip 502 can be designed to have an angle that is in the range of 10-80° relative to the Z-axis. For a detailed discussion, about an exemplary diamond turning machine that could be setup and controlled such that the diamond cutting tool 336 can machine the array of reflective structures 316 into the pick-off mirror 310, reference in made to a co-assigned U.S. Pat. No. 6,597,510 (the contents of this document are incorporated by reference herein).

Figure 6A:
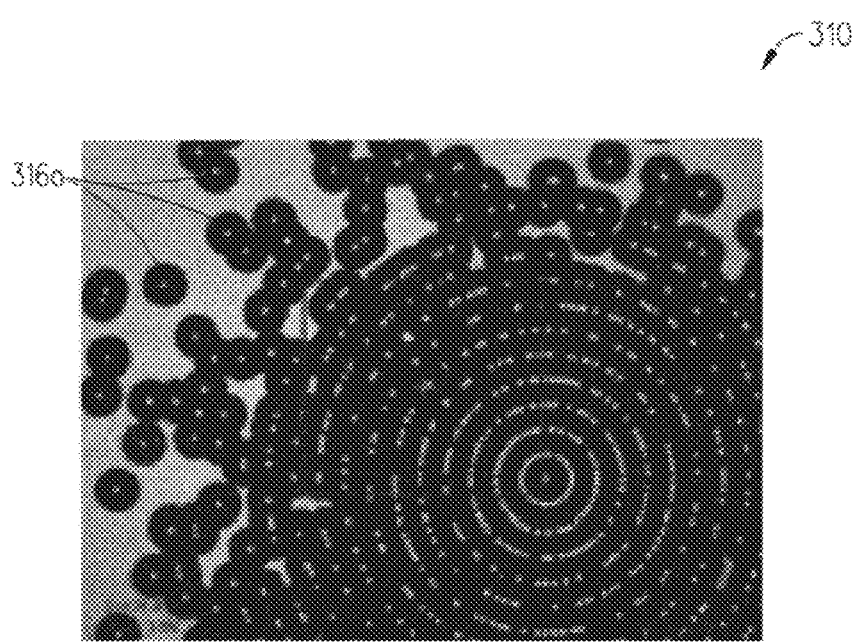
FIGS. 6A-6B are partial images of an exemplary pick-off mirror that has an array of reflective spherical structures in accordance with one embodiment of the present invention.
Figure 6B:
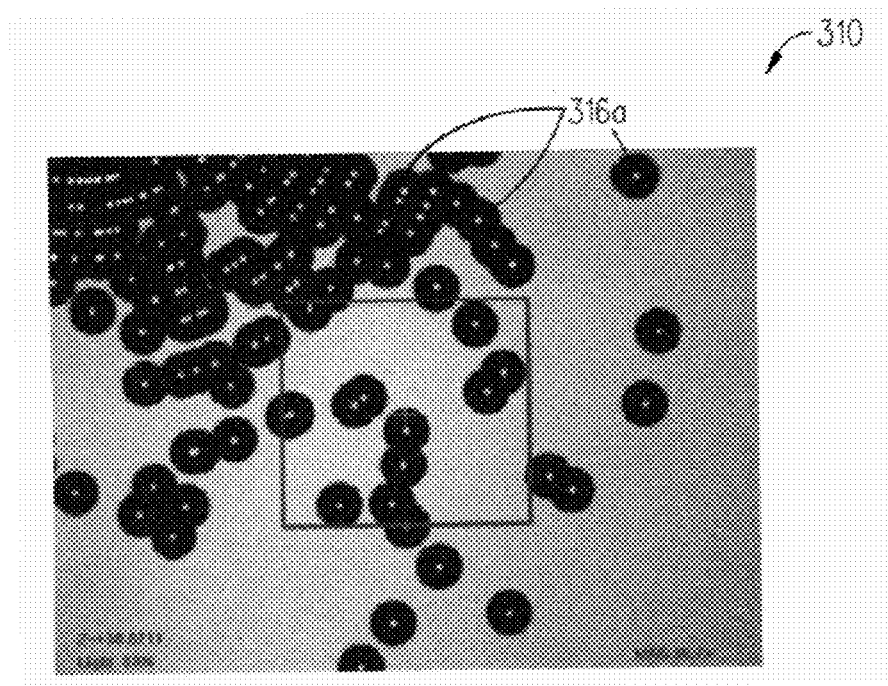
Figure 7:
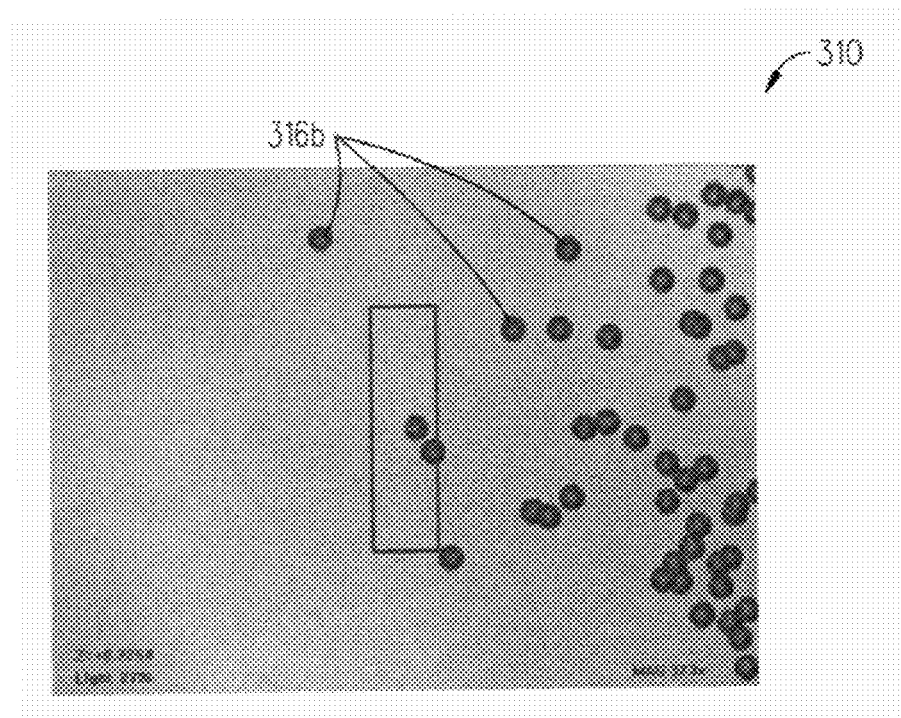
FIG. 7 is a partial image of an exemplary pick-off mirror that has an array of reflective spherical structures in accordance with another embodiment of the present invention.

In one embodiment, the diamond cutting tool 336 would be used to machine an array of reflective structures 316 where the individual reflective structures 316 are positioned such that their density decreases proportionally as one moves away from a center portion (or centroid) of the resulting reflective occulting mask 330 (see FIGS. 6-7). This type of lay-out for the array of reflective structures 316 (reflective occulting mask 330) is desired because the high intensity object 306 (e.g., sun 306) often has a Gaussian intensity distribution. In addition, the diamond cutting tool 336 could be designed to machine an array of reflective spherical structures 316a (see FIGS. 6A-6B). Or, the diamond cutting tool 336 could be designed to machine an array of reflective conical structures 316b (see FIG. 7) (note: the diamond cutting tool 336 could be designed to machine reflective structures 316 which have any type of geometry and not just a spherical geometry or a conical geometry).

The reflective spherical structures 316a have a disadvantage in that each of them have a small section at their center that reflects light in the same manner as a non-machined part of surface 315 of the pick-off mirror 310. This happens because at the very center of a reflective spherical structure 316a there is a small area that has the same angle (e.g., flat) as the non-machined portion of surface 315 and hence both of these areas reflect light towards the re-imaging device 312 (note: this small area is the bright spot in the middle of each reflective spherical structure 316a that can be seen in FIGS. 6A-6B). In contrast, the reflective conical structures 316b, as illustrated in FIG. 7, do not have a center area (e.g., flat area) that is as large as the small area (e.g., flat area) in the reflective spherical structures 316a. As such, the reflective conical structures 316b do not reflect the light to the same degree as the reflective spherical structures 316a towards the re-imaging device 312.

Figure 1:
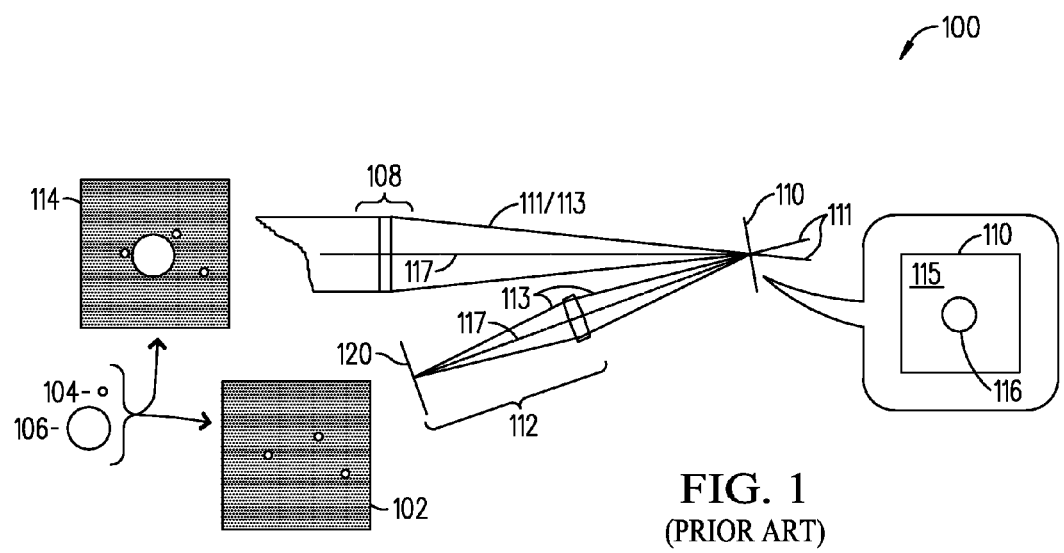
FIG. 1 (PRIOR ART) is a diagram illustrating the basic components of a traditional optical instrument which has a pick-off mirror with a hole (occulting mask) that has been setup to obtain an optical image containing three low intensity objects (e.g., planets) that are located in close proximity to a high intensity object (e.g., sun)
Figure 2:
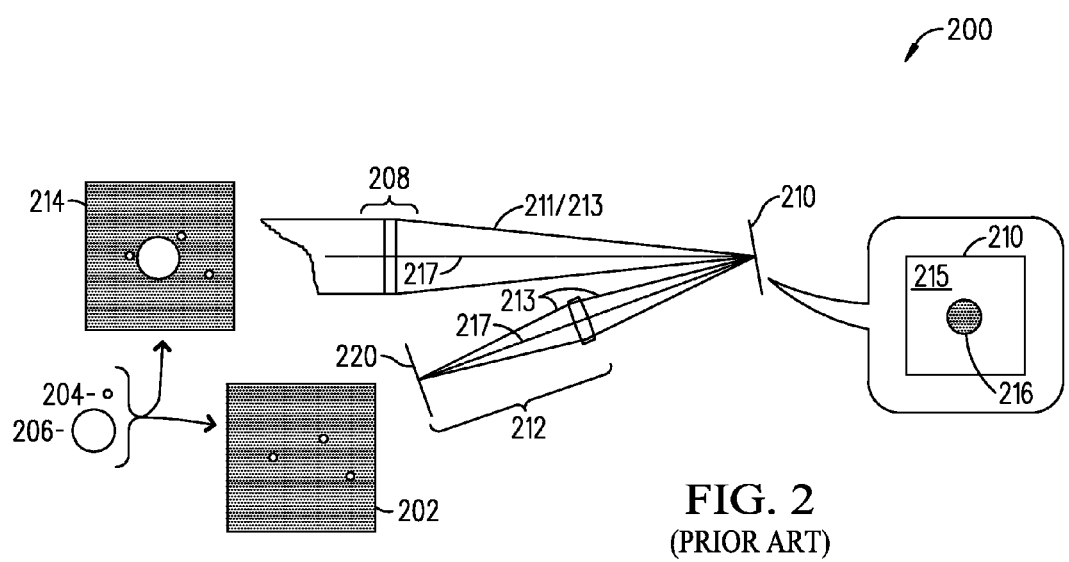
FIG. 2 (PRIOR ART) is a diagram illustrating the basic components of a traditional optical instrument which has a pick-off mirror with an opaque spot (absorptive occulting mask) that has been setup to obtain an optical image containing three low intensity objects (e.g., planets) that are located in close proximity to a high intensity object (e.g., sun)

The pick-off mirror 310 has a number of features and advantages over the traditional pick-off mirrors 110 and 210. These features and advantages are as follows (for example):

1) The pick-off mirror 310 and reflective structures 316 can be coated at the same time with a specially selected optical coating (see step 406 in FIG. 4). This optical coating (e.g., silver, gold, aluminum) can have a reflectivity that is greater than 98% over a broad range of wavelengths including visible wavelengths and infrared wavelengths. In contrast, the traditional pick-off mirror 210 that has the opaque spot(s) 216 (adsorptive occulting mask) uses an adsorptive coating with a reflectivity that is typically less than 90% (see FIG. 2).

2) The angle of the cone used in reflective conical structures 316b can be selectively chosen to direct the light out off the optical path 317 and away from the re-imaging device 312.

3) The diameter of each reflective structure 316 is a function of depth and hence the diameter can be controlled to a high degree of accuracy with the diamond turning machine 332. Typically, the reflective spherical structures 316a and the reflective conical structures 316b would typically have diameters that are in the range of 0.005-10 mm and depths that are in the range of 0.005-2 mm depending on the application.

4) The position of each reflective structure 316 can be precisely controlled, so the reflected intensity distribution can be controlled by varying the number of reflective structures 316 and/or their size per unit of area.

5) The pick-off mirror 310 is robust and can be designed to perform under adverse environmental conditions.

6) The pick-off mirror 310 can be easily integrated into an optical instrument 300 (note: the optical instrument 300 shown in FIG. 3 is exemplary and it should be appreciated that the pick-off mirror 310 of the present invention can be used in a wide-variety of optical instruments).

7) The diamond turning machine 332 can also be used to form one or more mounting features (e.g., holes, dowel pins, threads) directly within the pick-off mirror 310.

Although two embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. An optical instrument, comprising:
   an imaging device that receives an image containing light associated with a high intensity object and light associated with a low intensity object;

a solid pick-off mirror having a surface where a portion of which has an array of reflective structures machined therein that receives and deflects the light associated with the high intensity object and a remaining part of the surface not covered by the array of reflective structures that receives and reflects the light associated with the low intensity object; and a re-imaging device that receives the reflected light associated with the low intensity object and generates an image that contains the light associated with the low intensity object but does not contain the light associated with the high intensity object.

2. The optical instrument of claim 1, wherein said array of reflective structures is an array of reflective spherical structures.

3. The optical instrument of claim 2, wherein said reflective spherical structures have diameters that are in a range of 0.005-10 mm and depths that are in a range of 0.005-2 mm.

4. The optical instrument of claim 2, wherein said reflective spherical structures are positioned such that their density decreases proportionally as one moves away from a center portion of the array of reflective structures.

5. The optical instrument of claim 1, wherein said array of reflective structures is an array of reflective conical structures.

6. The optical instrument of claim 1, wherein said solid pick-off mirror including said array of reflective structures have a first optical coating applied thereon which was selected based on an operating wavelength of said imaging device and said re-imaging device.

7. The optical instrument of claim 6, wherein said first optical coating is silver if said imaging device and said re-imaging device operate in an ultraviolet wavelength or a visible wavelength.

8. The optical instrument of claim 6, wherein said first optical coating is aluminum if said imaging device and said re-imaging device operate in a visible wavelength.

9. The optical instrument of claim 6, wherein said first optical coating is gold if said imaging device and said re-imaging device operate in an infrared wavelength.

10. The optical instrument of claim 6, wherein said solid pick-off mirror including said array of reflective structures have a second optical coating which was applied over said first optical coating and which was selected to help enhance reflectivity and to help provide environmental protection.

11. The optical instrument of claim 6, wherein said first optical coating has a reflectivity that is greater than 98% over visible wavelengths and infrared wavelengths.

12. The optical instrument of claim 1, wherein said high intensity object is a sun and said low intensity object is a planet.

13. The optical instrument of claim 1, wherein said high intensity object is a sun or other infrared source and said low intensity object is a missile.

* * * * *